United States Patent [19]

Hagiwara et al.

[11] Patent Number: 4,594,203
[45] Date of Patent: Jun. 10, 1986

[54] METHOD FOR PRODUCING A THERMOPLASTIC POLYMERIC SHEET

[75] Inventors: Satoru Hagiwara; Ichiro Ishizuka, both of Otsu; Kazuo Okabe, Shiga, all of Japan

[73] Assignee: Toray Industries, Inc., Tokyo, Japan

[21] Appl. No.: 588,963

[22] Filed: Mar. 13, 1984

[30] Foreign Application Priority Data

Mar. 16, 1983 [JP] Japan ................................. 58-42323
Apr. 7, 1983 [JP] Japan ................................. 58-61195

[51] Int. Cl.$^4$ ............................................. B29C 71/04
[52] U.S. Cl. ........................................ 264/22; 264/24; 264/27; 264/85; 264/216; 425/174.8 E
[58] Field of Search ................. 264/22, 27, 24, 85, 264/216; 425/174.8 E

[56] References Cited

U.S. PATENT DOCUMENTS

| | | | |
|---|---|---|---|
| 3,223,757 | 12/1965 | Owens et al. | 264/22 |
| 3,427,686 | 2/1969 | Busby | 264/24 |
| 3,490,115 | 1/1970 | Owens et al. | 264/24 |
| 3,593,074 | 7/1971 | Isakoff | 264/24 |
| 3,655,307 | 4/1972 | Hawkins | 264/22 |
| 3,660,549 | 5/1972 | Hawkins | 264/22 |
| 3,686,374 | 8/1972 | Hawkins | 264/22 |
| 4,111,625 | 9/1978 | Remmington et al. | 425/174.8 E |
| 4,268,464 | 5/1981 | Yoshino et al. | 425/174.8 E |
| 4,310,294 | 1/1982 | De Geest et al. | 425/174.8 E |

FOREIGN PATENT DOCUMENTS

| | | | |
|---|---|---|---|
| 47-40300 | 10/1972 | Japan | 264/22 |
| 48-14784 | 5/1973 | Japan | |
| 48-24825 | 7/1973 | Japan | 264/22 |
| 55-17559 | 2/1980 | Japan | 264/22 |
| 56-2126 | 1/1981 | Japan | 425/174.8 E |

Primary Examiner—Jeffery Thurlow
Attorney, Agent, or Firm—Birch, Stewart, Kolasch & Birch

[57] ABSTRACT

The present invention relates to a method for producing a thermoplastic polymeric sheet, wherein a molten thermoplastic polymer is extruded from an extrusion die in the form of a sheet onto a moving quenching member, with an electric potential difference being established between the surface of the moving quenching member and the extrusion die, whereby the polymer is caused to electrostatically solidify and adhered to the surface of the quenching member. The contact area of the polymeric sheet with the moving quenching member is held in an atmosphere of a gas which posesses better insulating properties than standard air. Thus the present invention provides a useful method that can produce, at higher speeds than conventional method, polymer sheets of high surface quality which avoid the operational problems encountered in the conventional methods.

34 Claims, 8 Drawing Figures

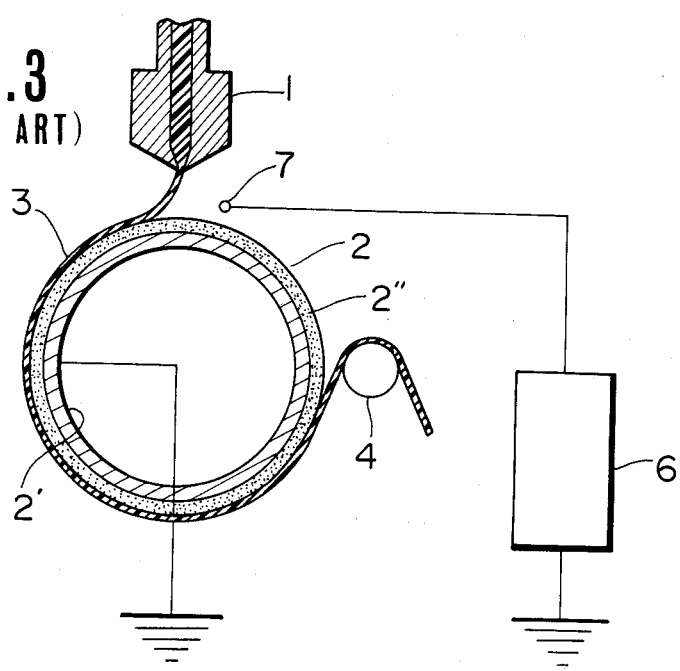
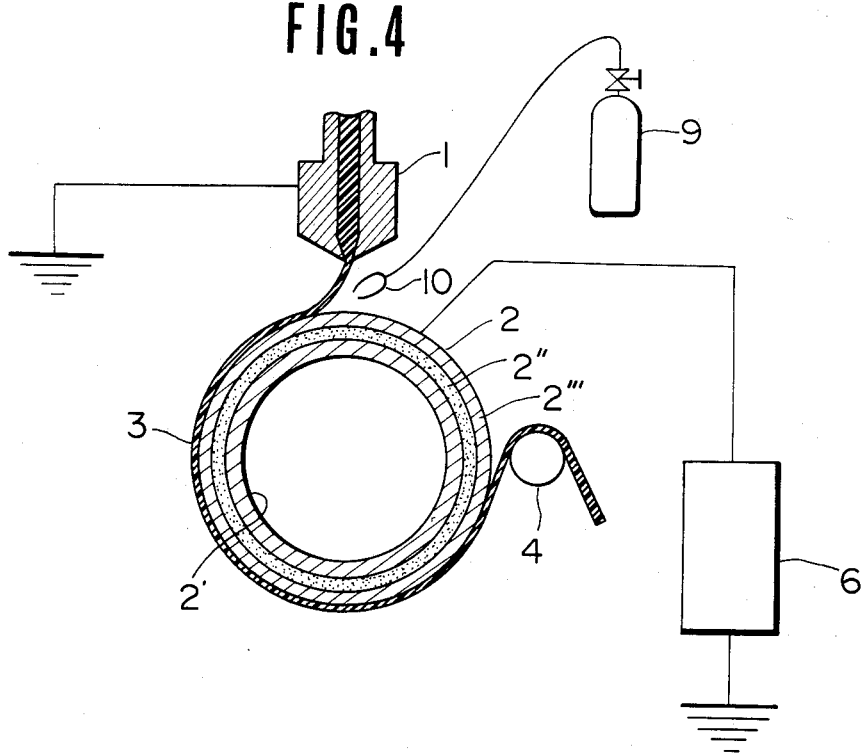

METHOD FOR PRODUCING A THERMOPLASTIC POLYMERIC SHEET

BACKGROUND OF THE INVENTION

(1) Field of the Invention

The present invention relates to a method for producing a thermoplastic polymeric sheet, more specifically to a method of extruding a molten thermoplastic polymer onto a moving quenching member where it is rapid-quenched and formed into a sheet, thereby producing a sheet of thermoplastic polymer.

(2) Description of the Prior Art

Various conventional methods are available for rapidly quenching a thermoplastic polymer and forming a sheet thereof utilizing static electricity. For instance there are U.S. Pat. Nos. 3,223,757 and 3,427,686 (hereinafter referred to as citation-1) which teach the method, as indicated in FIG. 1, in which a molten polymeric sheet 3 extruded out of an extrusion die 1 is brought into contact with a moving quenching member 2 to be quenched and solidified into a sheet. An electrode 5 is positioned on non-contact side of the molten polymeric sheet 3 near the point at which the sheet 3 contacts moving quenching member 2. Under the establishment of an electrical potential difference between the electrode 5 and the quenching member 2 through the use of a power supply 6, the sheet is produced. U.S. Pat. No. 4,310,294 (hereinafter referred to as citation-2) teaches a method wherein a polymeric sheet 3 is produced under the application of an electrical potential difference between the extrusion die 1 and the moving quenching member 2, as shown in FIG. 2. Japanese Patent Publication No. SHO 48-14784 (hereinafter referred to as citation-3) teaches the method shown in FIG. 3, wherein the moving quenching member 2 has an electrically insulated surface layer 2" on its surface 2'. The electrode 7 is set on the insulated surface layer 2" before it comes into contact with the molten polymeric sheet 3; and the sheet is produced under application of an electrical potential difference between the electrode 7 and the moving quenching member 2.

In all of these conventional methods, when the speed of the moving quenching member is increased to produce the polymeric sheet in a faster and more efficient manner, air is trapped between the sheet and the quenching member and as a consequence thereof the quality of the sheet surface tends to deteriorate. In citation-1, if the sheet is to be produced at a faster rate with no deterioration in the surface quality due to an entrapped air, either the electric potential of the electrode must be elevated or the electrode and the quenching member must be brought closer to each other. However, when the electric potential of the electrode is raised or the distance between the electrode and the quenching member is shortened, a arc discharge will be generated between the electrode and the quenching member, resulting in a substantial drop in the adherence of the sheet to the quenching member and a breakage of the quenching roller.

Thus in citation-1, it would be impossible to elevate the electric potential or to shorten the distance between the electrode and the quenching member to achieve faster production while at the same time achieving sufficient adherence. Accordingly 40–50 m/min. would be the limit of production speed. Furthermore, in citation-1, there are various problems, such as shortening of electrode life, breakage of the electrode and damage to the surface of the quenching member due to the corona discharge from the electrode to the quenching member which takes place when the polymeric sheet is defective (because the electrode is set with the polymeric sheet in between). These problems lead to various operational deficiencies.

Citation-2 and citation-3 are free from the above problems, but their limit in production speed is 25–30 m/min. which is considerably less than the value in citation-1.

The present inventors' investigations in trying to develop a method free from the above problems while achieving a higher limit of production speed revealed that in citation-2 the following problems occur at the limit speed of production:

(1) A very small discharge takes place between the moving quenching member and the polymeric sheet just before contacting the quenching member and as a consequence thereof the electrostatic adherence drops.

(2) When the electric potential is raised, an arc discharge takes place from the quenching member to the extrusion die from which the sheet is extruded and as a consequence thereof the adherence significantly drops and the surface of the quenching member is broken.

Thus citation-2 is also unsatisfactory in that the limit of production speed is low, because the electrical potential cannot be increased to the extent that production can be made faster while achieving sufficient adherence.

SUMMARY OF THE INVENTION

An object of the present invention is to provide a faster and more stable method for producing a polymeric sheet.

Another object of the present invention is to provide a method for producing a polymeric sheet having better surface quality and at a fast speed.

Still another object of the present invention is to provide a method for producing a polymeric sheet at a fast speed without the operational problems associated with conventional methods.

To be more specific, the present invention relates to a method for producing a thermoplastic polymeric sheet, wherein a molten thermoplastic polymer is extruded in a sheet from an extrusion die onto a moving quenching member, the contact area of polymer with the quenching member is maintained in a gas atmosphere which possesses better electrical insulation than the air, and the molten thermoplastic polymer is electrostatically adhered and solidified under the application of an electrical potential difference between the extrusion die and the moving quenching member.

BRIEF DESCRIPTION OF THE DRAWINGS

The present invention will become fully understood from the detailed description given hereinbelow and the accompanying drawings which are given by way of illustration only, and thus are not limitative of the present invention, and wherein:

FIG. 3 is schematic diagram of a conventional embodiment of citation-3; and

FIGS. 4 to 8 are schematic diagrams of various embodiments of the present invention.

DETAILED DESCRIPTION OF THE PRESENT INVENTION

There are two modes A and B which embody the present invention.

In mode A, a molten thermoplastic polymer is extruded from an extrusion die onto a moving quenching member, whose surface is held at a high electric potential to electrostatically adhere and solidify an extruded polymeric sheet; and thereby the contact area of the extruded polymer with the quenching member is held in a gas atmosphere which possesses a higher electrical insulation than the air.

Figure 6:
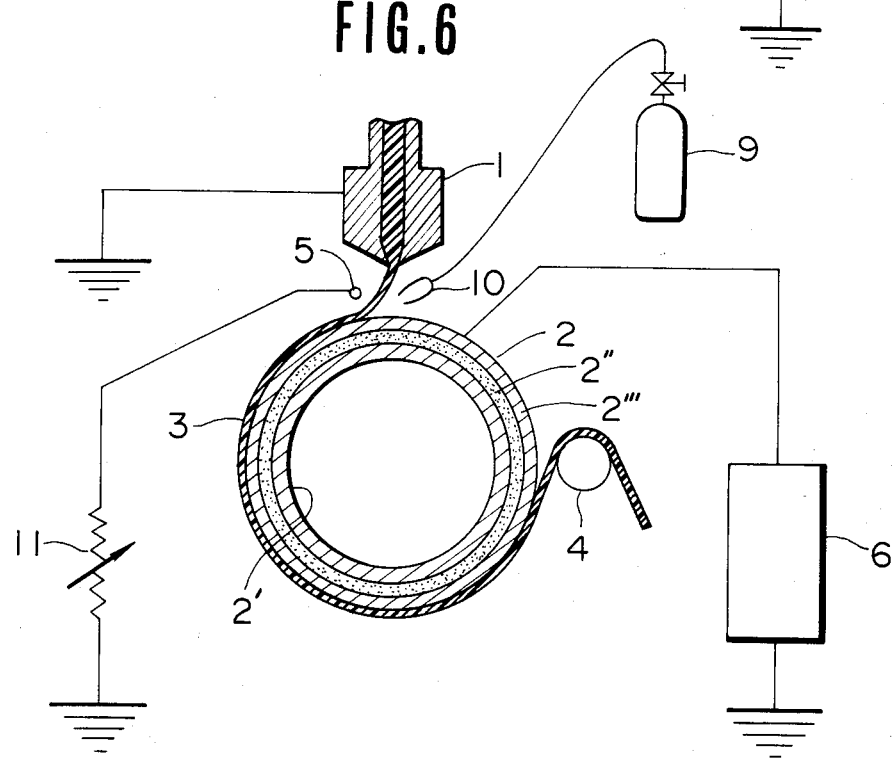
Figure 7:
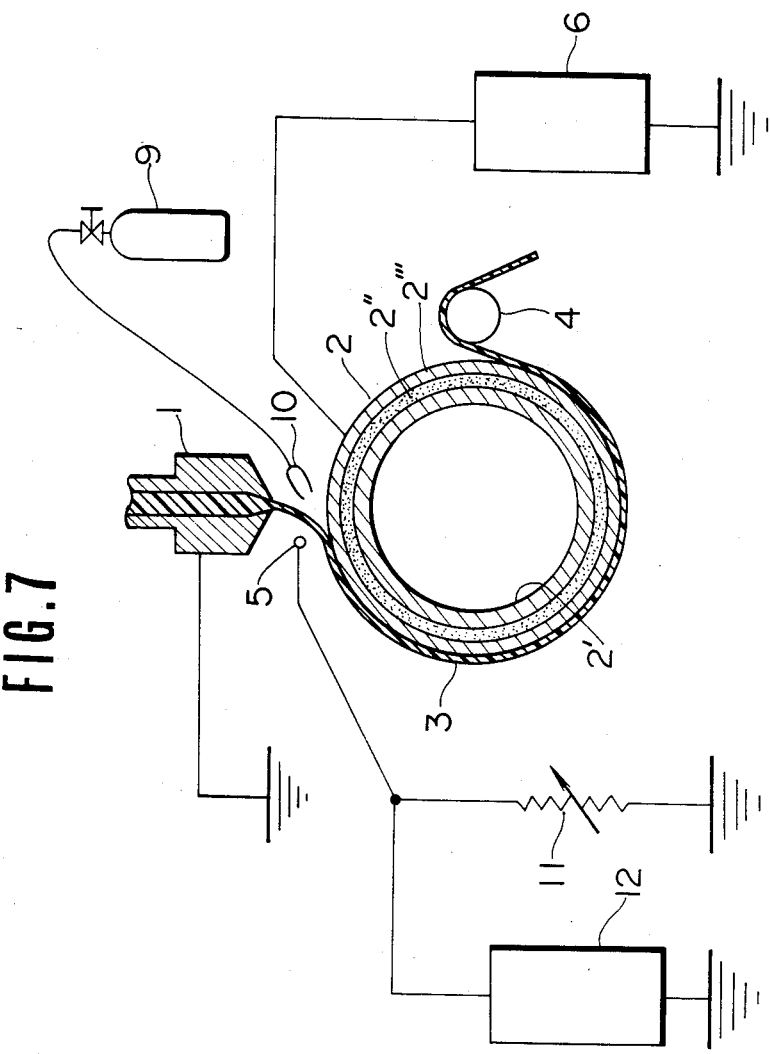

In mode B, as illustrated in FIGS. 6 and 7, an auxiliary electrode is further installed on the non-contact side of the extruded polymer near the point where the extruded polymer comes into contact with the moving quenching member, and an electric potential difference is also established between the auxiliary electrode and the moving quenching member.

Thermoplastic polymers utilized in the present invention are well-known polymers, copolymers or mixtures thereof which can be formed into a sheet, including, for example polyolefines such as polyethylene and polypropylene; polyesters such as polyethylene terephthalate; polyamids; polyimids; vinyl polymers, for example polystyrene, and the like.

These polymers may contain other additives to an extent that these additives do not conflict with the objects of the present invention. Of these polymers, polyesters or mixtures of polyesters and other thermoplastic polymers, with the polyesters as the dominant ingredient, are especially preferable for the present invention.

A so-called T-die with a slit which is commonly used in the production of thermoplastic polymeric sheets is preferable as the extrusion die used for the present invention. The molten sheet extruded out of the die may be single-layer or multi-layer.

Figure 8:
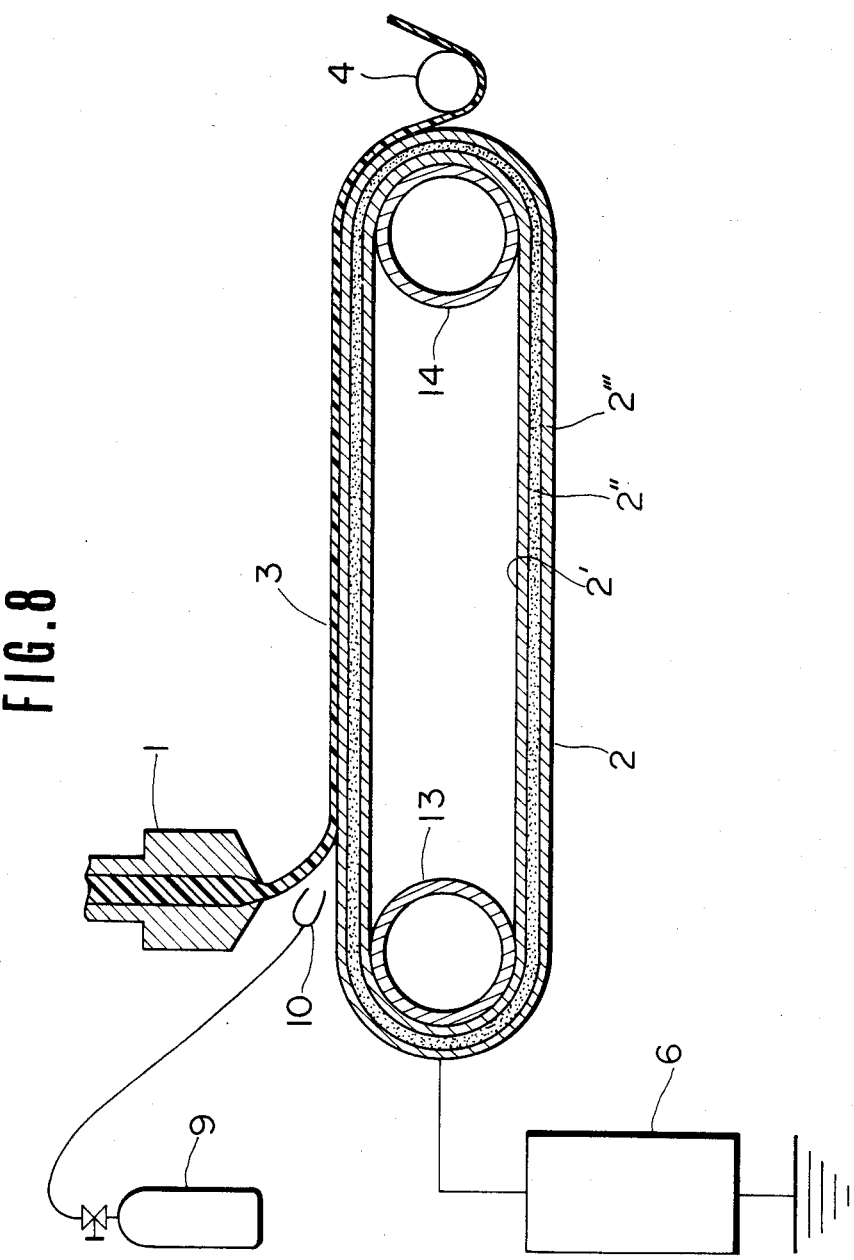

The moving quenching member of the present invention may be a cooling roller as illustrated in FIGS. 4–7 or a cooling belt as illustrated in FIG. 8 or any other appropriate structure. The cooling roller or the cooling belt may have its surface coated with another layer. According to the present invention a high electric potential difference is established between the moving quenching member and the extrusion die. The high electric potential may be applied with the moving quenching member electrically insulated in relation to the ground or with the extrusion die electrically insulated in relation to the ground or with both the moving quenching member and the extrusion die being electrically insulated in relation to the ground.

As for the insulation of the moving quenching member, there are many methods available such as coupling the bearing of the moving quenching member with an electric insulator; attaching an insulating sleeve to the rotating shaft and insulating the shaft from a gear which is attached to said shaft; or providing an electrically insulating layer 2" on the body 2' of the moving quenching member 2, as indicated in FIGS. 4, 6, 7 and 8, and further providing an electrically conductive layer 2"' on the electrically insulating layer 2", thus insulating the electrically conductive layer 2"' to the ground. The body 2' of the moving quenching member 2 may be fabricated of various materials known in the technical fields concerned. For instance, common steel or stainless steel is usually available.

The electrically conductive material which comprises the electrically conductive layer in the present invention is a substance with a volume resistivity of less than $10^8 \Omega\cdot\text{cm}$ or preferably one with a volume resistivity of less than $10^{-3} \Omega\cdot\text{cm}$. There is no particular limitation on the electrically conductive substance which can be used, but advantageously Fe, Cr, Ni, Cu and other electrically conductive metals or their alloys can be employed.

As for the insulation of the extrusion die, a method of fabricating the apparatus (polymer pipe, die-holder) between the extrusion die and the ground with an insulating substance having a volume resistivity of more than $10^9 \Omega\cdot\text{cm}$ can be utilized.

For the purpose of holding the moving quenching member surface or the extrusion die at a high electrical potential, a voltage of either A.C. or D.C., is applied, preferably D.C. with less than 1% in the voltage variation rate.

Application of an electric potential difference according to the present invention includes both generating a potential difference using an external power supply and causing a potential difference between the ends of a resistor by imposing thereto an electric current.

The electric potential difference (voltage $E_1$) to be applied between the extrusion die and the moving quenching member is desirably greater then 8 KV and less than 60 KV or more desirably greater than 15 KV and less than 40 KV. If $E_1$ is less than 8 KV, the effect will be small, but if it is more than 60 KV, there is the hazard of an arc discharge taking place from the quenching member to the extrusion die.

It is also desirable that the moving quenching member be electrically negative to the extrusion die.

In mode B, the electric potential difference (voltage $E_2$) to be further applied between the auxiliary electrode and the moving quenching member must be smaller than $E_1$.

$E_2$ is desirably greater than 3 KV and less than 20 KV or more desirably greater than 5 KV and less than 15 KV. If $E_2$ is less than 3 KV, the effect will be small; but if it is more than 20 KV, a corona discharge may take place between the auxiliary electrode and the moving quenching member. It is desirable that the moving quenching member be electrically negative to the auxiliary electrode.

In the present invention it is desirable that at least either the extrusion die or the moving quenching member be electrically insulated in relation to the ground.

Electric insulation in the present invention refers to the state of being electrically insulated to over $10^9 \Omega$. In the present invention the contact area between the polymeric sheet and the moving quenching member should be maintained in an atmosphere of a gas which is more insulating than the air. The zone which should be maintained in such an atmosphere, that is, the contact area between the polymeric sheet and the moving quenching member, according to the present invention, is in the vicinity of the point where the polymeric sheet comes into contact with the moving quenching member, desirably the space between the polymeric sheet, after it has been extruded into a sheet and before it comes into contact with the moving quenching member, and the surface of the moving quenching member and the space between the polymeric sheet yet to come into contact with the moving quenching member and the polymeric sheet which has come into contact with the moving quenching member. Advantageously, the space is wider than the width of the polymeric sheet, and a space extending at least more then 3 mm on both sides of a perpendicular plane to the moving quenching member which is drawn at the contact point.

A gas more insulating than air (hereinafter called the insulator gas), as defined by the present invention, is a gas having a larger value of the dielectric break down voltage, as measured by the method specified in ASTM D 2477, than that of standard air. Advantageously, a gaseous atmosphere obtained by using a single gas, a gas mixture or a gas-air mixture with a higher insulation than that of gaseous air at ambient temperature is utilized, the atmosphere having an insulation value greater than 1.3 times, preferably greater than 2 times that of standard air. The standard air refers to a gas which contains 21% $O_2$ gas by volume and 78% $N_2$ gas by volume, and whose relative humidity is 50%.

Typical gases satisfying the above requirements include sulfur fluorides have a molecular weight in excess of 100, such as $SF_6$; and various fluorocarbons having a molecular weight in excess of 100 such as $CFCl_3$, $CF_2Cl_2$, $CF_3Cl$, $CF_3Br$, $C_2F_6$, $C_2Cl_2F_4$, $C_2ClF_5$, and $C_4F_8$.

The contact area can be maintained in a gaseous atmophere more insulating than the air either by (1) wholly covering the contact area to cut off the external air and replacing the external air with the desired gaseous atmosphere or by (2) continuously supplying a gas stream to the contact area from a nozzle or the like as shown in FIGS. 4–8. Generally speaking, option (2) is preferable to option (1), because in the case of option (1) the cover is deposited with sublimation from the molten polymer.

The auxiliary electrode mentioned in the present invention may be anything electrically conductive such as metal or, carbon, and its configuration may be in the form of a wire, a needle, a knife, a band or anything adopted for electrostatic casting in the prior art. The most popular electrode is a wire or a knife.

The present invention will be described with reference to the drawings which should not be considered as limiting, in any way, the scope of the present invention.

Figure 5:
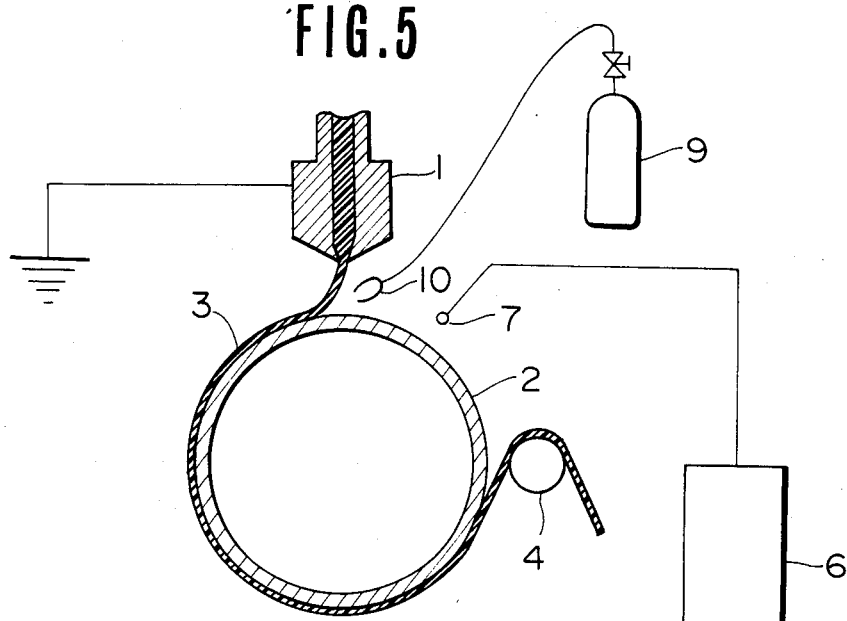

FIGS. 4 to 8 are sectional views illustrating embodiments of the present invention. FIGS. 4, 5 and 8 refer mode A and FIGS. 6 and 7 refer to mode B.

In each figure, element 1 is the extrusion die; element 2 is the moving quenching member (which is a cooling roller in FIGS. 4 to 7; and a cooling belt in FIG. 8); element 3 is the polymeric sheet; element 4 is the removing roller for removing the sheet from the moving quenching member; element 5 is the auxiliary electrode (shown only in FIGS. 6 and 7); and element 6 is the power supply. In FIGS. 4, 6, 7 and 8, element 2" is the electrically insulating layer and element 2‴ is the electrically conductive layer. Element 7 in FIG. 5 is a charging electrode; element 9 is an insulated gas cylinder; element 10 is an insulated gas supply nozzle; and element 11 is a resistor. In FIG. 7, element 12 is an auxiliary power supply and elements 13 and 14 in FIG. 8 are belt-guide rollers.

In each figure, the molten polymeric sheet 3 extruded from the extrusion die 1 comes into contact with the moving quenching member 2 where it is cooled and solidified. Then via the roller 4 the polymeric sheet is sent to the succeeding necessary stations.

Being variable according to the intended purpose, the thickness of the polymeric sheet 3 is not particularly restricted, but usually it is about 3μ–3 mm after being cooled and solidified. The surface of the moving quenching member 2 may be set at an appropriate temperature according to the intended purpose. The surface temperature is normally set to be below the glass-transition point of the polymer being quenched, desirably below about 80° C. in the case of polyethylene terephthalate. The insulator gas is continuously supplied to the contact area via an insulator gas supply nozzle 10 from an insulator gas cylinder 9. The gas supply rate is experimentally determined depending on the nozzle position, the kind of gas, and the electrical potential difference which is being applied. The supply rate should be more than minimum amount necessary to shield the contact area with a gaseous atmosphere at least more insulating than the air, advantageously more than 1.3 times more insulating than the air. However, an excessive supply rate will be economically and technically disadvantageous, because a gas stream hitting the molten polymeric sheet 3 between the extrusion die 1 and the quenching member 2 will make the sheet 3 vibrate, causing a thickness variance or an unevenness in the surface of the product. As an example, $SF_6$ is supplied through a nozzle positioned 20 mm from the polymeric sheet 3. The supply rate is 0.2–3 l/min. per sheet width (cm), advantageously 0.5–2 l/min. per sheet width (cm). As for the quenching member, the moving quenching member 2, as illustrated in FIGS. 4, and 6 to 8, with its body 2' superimposed with an electrically insulating layer 2" and a conductive layer 2‴ is advantageous, because a coolant like common water can be circulated within such a quenching member.

In the case of a moving quenching member lacking such an insulating layer 2", an electrically insulating coolant such as trichloroethylene, trichlorotrifluoroethane, tetrachlorodifluoroethane is utilized to quench the polymeric sheet 3 by the quenching member 2. As for the configuration of the moving quenching member 2, FIGS. 4 to 7 illustrate the case of utilizing a cooling roller and FIG. 8 illustrates the case of utilizing a cooling belt. FIGS. 6 and 7 are examples of mode B, in which the electrode 5 is a wire. FIG. 6 is an example of $E_2$ being generated by the current flowing through the resistor 11 and FIG. 7 is an example of applying $E_2$ from the external power supply 12.

In FIG. 4 the present invention is defined as follows: The moving quenching member 2 is composed of the body 2', provided with the electrically insulating layer 2" and the electrically conductive layer 2‴.

An appropriate coolant, for example a conductive medium such as water, is circulated to maintain a specified cooling temperature. The extrusion die 1 is electrically grounded and a required electric potential difference is established between the conductive layer 2‴ of the moving quenching member 2 and the extrusion die 1 by means of the power supply 6. The molten polymeric sheet 3 extruded from the extrusion die 1 comes into contact with a rotating quenching member 2 with the contact area of the sheet 3 and the quenching member 2 maintained in a gaseous atmosphere supplied via the insulator gas nozzle 10 from the insulator gas cylinder 9. Thereupon the polymeric sheet is cooled to solidification. Then the polymeric sheet is removed from the quenching memeber 2 by the roller 4. The removed polymeric sheet can then be sent, if necessary, to a subsequent station, for example a stretching station.

In the embodiment illustrated in FIG. 5, the arrangement is essentially the same as in FIG. 4, except in two respects, namely in that there is no lamination of the electrically insulating layer 2" and the electrically conductive layer 2''', and the surface of the moving quenching member 2 is electrostatically charged with a potential via a space by means of the power supply 6 using a charging electrode 7.

In such an arrangement either the extrusion die 1 or the moving quenching member 2 can be electrically insulated in relation to the ground.

In FIG. 5 the extrusion die 1 is grounded and the moving quenching member 2 is electrically insulated in relation to the ground by any desired means. The coolant flowing through the moving quenching member 2 is an electrically insulating material such as trichloroethylene, trichlorotrifluoroethane or tetrachlorodifluoethane. The insulator gas is supplied through the nozzle 10. An electric potential difference is applied between the extrusion die 1 and the moving quenching member 2 by means of the power supply 6. The molten polymeric sheet 3 extruded from the extrusion die 1 comes into contact with the moving quenching member 2 which is a rotating roller in this case, where it is cooled and solidified. Then the sheet is removed from the moving quenching member 2 by means of a roller 4. The polymeric sheet 3 can be delivered to a succeeding stretching station, if necessary.

In the embodiment illustrated in FIG. 6, the arrangement is substantially equivalent to that in FIG. 4, except in the following respect, that is, for achieving better adherence of the polymeric sheet 3 to the moving quenching member 2, an auxiliary electrode 5 is installed near the contact point of the polymeric sheet 3 with the moving quenching member 2 and on the side of the polymeric sheet 3 which is not contacting the moving quenching member 2. Since the auxiliary electrode 5 is grounded via the resister 11, $E_2$, the electric potential difference to be established between the auxiliary electrode 5 and the moving quenching member 2 is smaller than $E_1$, the electric potential difference to be established between the extrusion die 1 and the moving quenching member 2.

In the embodiment illustrated in FIG. 7, an auxiliary power supply 12 is connected in parallel to the resister 11 of FIG. 6. Otherwise the arrangement is identical to that in FIG. 6. In FIG. 7, the electric potential difference $E_2$ is applied by means of the auxiliary power supply 12, and the electric potential difference $E_1$ is applied by means of the power supply 6.

In the embodiment illustrated in FIG. 8, the moving quenching member 2 is a belt instead of a roller or a drum as in FIG. 4, but the working principle is substantially the same as that in FIG. 4. The moving quenching member 2 consists of the body 2' in a form of a belt, an electrically insulating layer 2" and an electrically conductive layer 2'''. The moving quenching member 2, which is a belt in this embodiment, is driven to rotate by at least one of the belt-guide rollers 13 or 14 or any other desired means (not shown). Quenching by means of the moving quenching member 2 is effected by circulation of a coolant through the belt-guide roller 13 and/or 14 or by any other desired method.

As explained above, the method according to the present invention can produce a thermoplastic polymeric sheet 3 of good surface quality, at a faster speed and more stably than methods using conventional means. Thus the present invention is very useful for producing a common thermoplastic resin sheet, particularly an original sheet to be stretched into a film.

The following examples are exemplary of the present invention and accordingly should not be considered as being limitative.

EXAMPLE 1

Polyethylene terephthalate pellets having an intrinsic viscosity of 0.630 at 25° C.-orthochlorophenol solution are vacuum-dried at 150° C. and then rendered molten at 280° C. in an extruder having a 150 mm $\phi$ screw. The molten resin is then sent to the extrusion die 1, as illustrated in FIG. 4, with a slit width 1.0 mm, extruded therefrom in a sheet 3 having a width of 400 mm and cooled to a solidified product on the moving quenching member 2 (cooling roller), to yield a sheet product.

The cooling roller 2 with a diameter of 800 mm is cooled with cooling water at 35° C. The surface of the roller is coated with alumina to form an electrically insulating layer 2", which is additionally chrome-coated and mirror-finished to form an electrically conductive layer 2'''. Thus the conductive layer 2''' is perfectly insulated to the body 2' of the moving quenching member 2. The electrically conductive layer 2''' is separated a distance of 25 mm from the extrusion die 1.

An insulator gas, $SF_6$ is supplied at a rate of 30 l/min. through the nozzle 10 disposed 20 mm from the polymeric sheet 3. The extrusion die 1 is electrically grounded. The surface conductive layer 2''' of the cooling roller is applied with an electric potential of $-30$ KV by means of the power supply 6. In this production a polymeric sheet, the manufacturing speed can be raised to 80 m/min. without a decline in the sheet adherence.

EXAMPLE 2

In the same way as in Example 1, the same polyethylene terephthalate pellets as used in Example 1 are treated to form a sheet in an apparatus illustrated in FIG. 7 which is the same as the one employed in Example 1 with the addition of an auxiliary electrode 5. The auxiliary electrode 5 is a 0.25 mm $\phi$ tungsten wire and was provided 5 mm above the surface of the cooling roller. The conditions of the apparatus are the same as in Example 1 except in the following points. The supply rate of $SF_6$ as the insulator gas is 20 l/min. The extrusion die is electrically grounded. The surface conductive layer 2''' of the cooling roller is applied with an electric potential difference of $-12$ KV by means of the power supply 6. Moreover, a voltage of $-6$ KV is applied to the auxiliary electrode 5 by means of the auxiliary power supply 12. In this production of a polymeric sheet, the manufacturing speed can be increased to 90 m/min. without a decline in sheet adherence.

COMPARISON EXAMPLE 1

Figure 2:
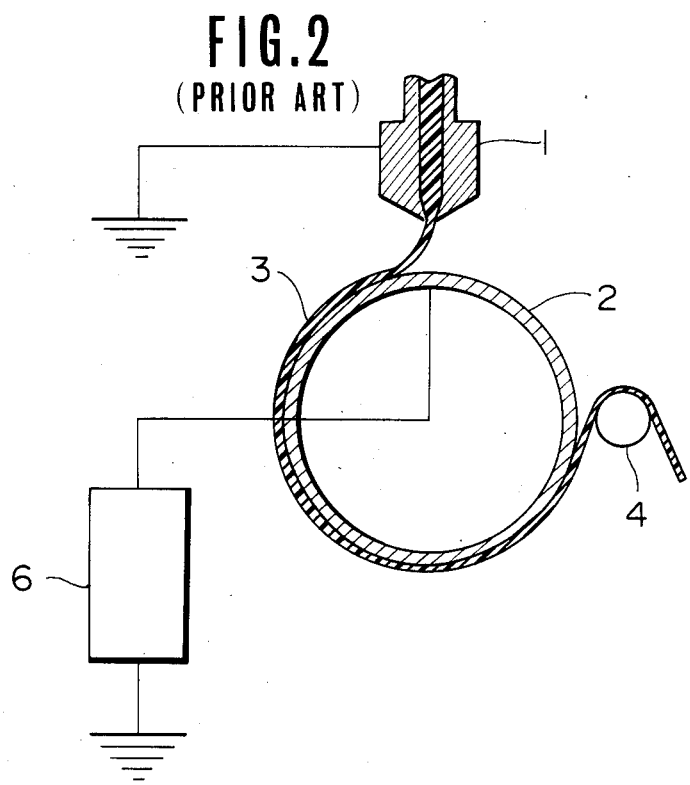
FIG. 2 is a schematic diagram of a conventional embodiment of citation-2.

Using the device shown in FIG. 2, a polymeric sheet is produced in the same way as in Example 1. With a D.C. potential difference of 15 KV applied between the cooling roller and the extrusion die, the speed is increased, and as a consequence, the sheet adherence became poor at 30 m/min.

Even with an increased electric potential the adherence did not improve. Thus an increase in the production speed could not be attained.

COMPARISON-EXAMPLE 2

Figure 1:
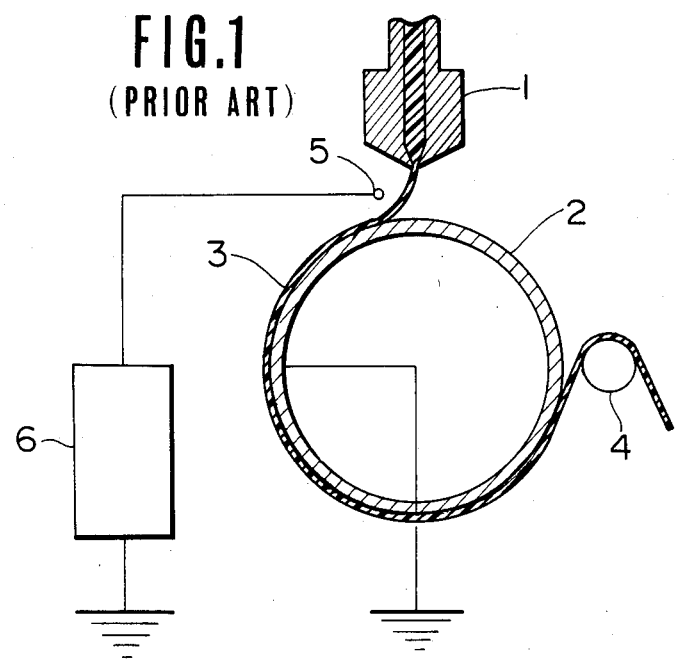
FIG. 1 is a schematic diagram of a conventional embodiment of citation-1.

Using the device shown in FIG. 1, a polymeric sheet was produced in the same way as in Example 2. The cooling roller was electrically grounded and the wiring of the electrode 5 is modified as illustrated in FIG. 1, otherwise the arrangement is the same as in Example 1. With a D.C. electric potential difference of 10 KV applied between the electrode and the cooling roller, the speed is increased and as a consequence the sheet adherence became poor at 50 m/min.

With an increased potential difference, an arc discharge developed from the electrode to the cooling roller. Thus a further increase in production is unsuccessful.

As demonstrated in the above examples, adoption of the method according to the present invention has substantially elevated the upper limit of sheet production speed, namely from 50 m/min. to 90 m/min.

The invention being thus described, it will be obvious that the same may be varied in many ways. Such variations are not to be regarded as a departure from the spirit and the scope of the invention, and all such modifications as would be obvious to one skilled in the art at=re intended to be included within the scope of the following claims.

What is claimed is:

1. A method for producing a thermoplastic polymeric sheet comprising:
   extruding a molten thermoplastic polymer in the form of a sheet from an extrusion die onto a moving quenching member;
   maintaining the contact area of the molten thermoplastic polymer in the form of a sheet with the moving quenching member in a gaseous atmosphere more insulating than that of air; and
   electrically adhering the molten thermoplastic polymer in the form of a sheet to the quenching member and solidifying the sheet with an electric potential difference applied between the extrusion die and the moving quenching member.

2. The method of claim 1 wherein an auxiliary electrode is disposed on the non-contact side of the polymeric sheet with the moving quenching member and an electric potential difference is established between said auxiliary electrode and the moving quenching member.

3. The method of claim 1 wherein the electric potential difference established between the extrusion die and the surface of the moving quenching member is a potential difference generated by D.C. with less than 1% variation in the voltage rate.

4. The method of claim 2 wherein the electric potential difference established between the extrusion die and the auxiliary electrode, and the surface of the moving quenching member is a potential difference generated by D.C. with less than 1% variation in the voltage rate.

5. The method of claim 1 wherein the gas which is more insulating than air is a gas with more than 1.3 times the insulating quality of the air in terms of the dielectric break down voltage as measured by the method specified in ASTM D 2477.

6. The method of claim 1 wherein the gas which is more insulating than air is a gas selected from the group consisting of halogenated hydrocarbons having a molecular weight larger than 100 and having a gaseous state at a room temperature, sulfur fluoride having a molecular weight larger than 100 and having a gaseous state at a room temperature, a mixture of these materials and a mixture of these materials and air.

7. The method of claim 2 wherein said auxiliary electrode is a wire, a needle, a knife or a band.

8. The method of claim 1 wherein the electric potential difference ($E_1$) established between the extrusion die and the moving quenching member is from 8 KV to 60 KV.

9. The method of claim 2 wherein the electric potential difference ($E_1$) established between the extrusion die and the moving quenching member is from 8 KV to 60 KV, while the electric potential difference ($E_2$) established between the auxiliary electrode and the moving quenching member is less than $E_1$ and ranges from 5 KV to 15 KV.

10. The method of claim 1 wherein the moving quenching member is a cooling roller or a cooling belt.

11. The method of claim 1 wherein the moving quenching member, on at least its surface, comprises an electrically conductive material of less than $10^8 \Omega.cm$ in volume resistivity.

12. The method of claim 1 wherein the moving quenching member, on at least its surface, comprises an electrically conductive material of less than $10^{-3} \Omega.cm$ in volume resistivity.

13. The method of claim 1 wherein at least the extrusion die or the moving quenching member is electrically insulated in relation to the ground.

14. The method of claim 1 wherein the gas is supplied through a nozzle.

15. The method of claim 1 wherein said polymeric sheet is a single sheet or a laminated sheet of a material selected from the group consisting of polyolefines, polyesters, polyamides, polymides, vinyl polymers, copolymers thereof and mixtures thereof.

16. The method of claim 1 wherein said polymeric sheet is either a polyester sheet or a laminated sheet of a polyester and another thermoplastic polymer.

17. The method of claim 2 wherein the gas which is more insulating than air is a gas with more than 1.3 times the insulating quality of the air in terms of the dielectric break down voltage as measured by the method specified in ASTM D 2477.

18. The method of claim 2 wherein the gas which is more insulating than air is a gas selected from the group consisting of halogenated hydrocarbons having a molecular weight larger than 100 and having a gaseous state at a room temperature, sulfur fluoride having a molecular weight larger than 100 and having a gaseous state at a room temperature, a mixture of these materials and a mixture of these materials and air.

19. The method of claim 2 wherein the moving quenching member is a cooling roller or a cooling belt.

20. The method of claim 2 wherein the moving quenching member, on at least its surface, comprises an electrically conductive material of less $10^8 \Omega.cm$ in volume resistivity.

21. The method of claim 2 wherein the moving quenching member, on at least its surface, is constituted of an electrically conductive material of less than $10^{-3} \Omega.cm$ in volume resistivity.

22. The method of claim 2 wherein at least the extrusion die or the moving quenching member is electrically insulated in relation to the ground.

23. The method of claim 2 wherein the gas is supplied through a nozzle.

24. The method of claim 2 wherein said polymeric sheet is a single sheet or a laminated sheet of a material selected from the group consisting of polyolefines, polyesters, polyamides, polyamides, vinyl polymers, copolymers thereof and mixtures thereof.

25. The method of claim 2 wherein said polymeric sheet is either a polyester sheet or a laminated sheet of a polyester and another thermoplastic polymer.

26. The method of claim 1 wherein the contact area between the polymeric sheet and the moving quenching member is in the vicinity of the point where the polymeric sheet comes into contact with the moving quenching member.

27. The method of claim 26 wherein the contact area is completely covered to exclude external air said contact area being supplied with said gaseous atmosphere more insulative than air.

28. The method of claim 26 wherein the insulating gas is applied to the contact area from a nozzle.

29. The method of claim 1 wherein the surface of the moving quenching member is below the glass-transition point of the polymer being quenched.

30. The method of claim 1 wherein the thermoplastic polymer is polyethylene terephthalate.

31. The metod of claim 1 wherein the surface of the quenching member is provided with an insulating layer which in turn is provided with an electrically conductive layer and an electrical potential difference established between the electrically conductive layer of the quenching member and the extrusion die.

32. The method of claim 1 wherein the surface of the moving quenching member is electrostatically charged with a potential by a charging electrode disposed on the contact side of the thermoplastic polymer with the quenching member.

33. The method of claim 31 wherein an auxiliary electrode is disposed on the non-contact side of the polymeric sheet with the moving quenching member and an electric potential difference is established between said auxiliary electrode and the moving quenching member.

34. The method of claim 33 wherein the auxiliary electrode is grounded via a resister and an auxiliary power supply is connected in parallel to the resister.

* * * * *